United States Patent [19]
Sanchez et al.

[11] Patent Number: 5,167,280
[45] Date of Patent: Dec. 1, 1992

[54] SINGLE HORIZONTAL WELL PROCESS FOR SOLVENT/SOLUTE STIMULATION

[75] Inventors: James M. Sanchez, Dallas; Randy D. Hazlett, Carrollton, both of Tex.

[73] Assignee: Mobil Oil Corporation, Fairfax, Va.

[21] Appl. No.: 720,075

[22] Filed: Jun. 24, 1991

Related U.S. Application Data

[63] Continuation-in-part of Ser. No. 553,149, Jun. 24, 1991, abandoned.

[51] Int. Cl.[5] .................... E21B 43/22; E21B 43/24; E21B 43/40
[52] U.S. Cl. .................................. 166/267; 166/50; 166/302; 166/303; 166/306
[58] Field of Search ............... 166/50, 267, 302, 303, 166/305.1, 306

[56] References Cited

U.S. PATENT DOCUMENTS

| | | | |
|---|---|---|---|
| 3,500,917 | 3/1970 | Lehner et al. | 166/272 |
| 3,547,193 | 10/1969 | Gill | 166/248 |
| 3,838,738 | 10/1974 | Redford et al. | 166/271 |
| 4,026,358 | 6/1976 | Allen | 166/261 |
| 4,067,391 | 1/1978 | Dewell | 166/303 |
| 4,116,275 | 9/1978 | Butler et al. | 166/57 X |
| 4,257,650 | 3/1981 | Allen | 166/50 X |
| 4,293,035 | 10/1981 | Fitch | 166/263 |
| 4,344,485 | 8/1982 | Butler | 166/271 |
| 4,373,585 | 2/1983 | Fitch et al. | 166/263 |
| 4,398,602 | 8/1983 | Anderson | 166/245 |
| 4,456,065 | 6/1984 | Heim et al. | 166/248 |
| 4,485,869 | 12/1984 | Sresty et al. | 166/248 |
| 4,545,435 | 10/1985 | Bridges et al. | 166/245 X |
| 4,753,293 | 6/1988 | Bohn | 166/267 |
| 4,844,158 | 7/1989 | Jennings, Jr. | 166/267 |

*Primary Examiner*—George A. Suchfield
*Attorney, Agent, or Firm*—A. J. McKillop; C. J. Speciale; C. A. Malone

[57] ABSTRACT

A solvent stimulation process whereby a viscosity reducing agent is circulated through a horizontal well via a production string. Said agent exits the production string and enters an annulus formed by said string and a liner. Said agent diffuses into the reservoir at a pressure below the reservoir pressure. As said agent diffuses through the reservoir under the influence of a concentration gradient, it reduces the oil's viscosity and makes it mobile. Simultaneously, oil of reduced viscosity migrates into the well under a pressure drawdown influence. A pseudo steady state production rate is achieved when convective movement of the oil of reduced viscosity is exactly counterbalanced by the diffusional rate of the viscosity reducing agent in a stimulated radial zone along said well. This stimulates a large volume of oil through the extensive surface area of the wellbore thus producing increased volumes of hydrocarbonaceous fluids from the reservoir.

5 Claims, 3 Drawing Sheets

SINGLE HORIZONTAL WELL PROCESS FOR SOLVENT/SOLUTE STIMULATION This application is a continuation-in-part of U.S. patent application Ser. No. 07/533,149, filed on Jun. 24, 1991, now abandoned.

FIELD OF THE INVENTION

This invention is directed to a method for the recovery of viscous hydrocarbonaceous fluids from a formation. More specifically, it is directed to the removal of said fluids from a formation containing heavy viscous hydrocarbons or tar sands by concentric horizontal wellbores in combination with solvent stimulation.

BACKGROUND OF THE INVENTION

Use of horizontal wells in oil reservoirs is currently of high interest within the oil industry. Horizontal wells allow more reservoir surface area to be contacted and thereby reduce inflow pressure gradients for reasonable oil production rates. Alternatively, for typical pressure gradients within the wellbore region, the productivity of a horizontal well is greater than that in a vertical well.

Possible benefits of horizontal wells are currently being exploited in the Canadian tar sands. Reservoirs in Canada that may be categorized as immobile under reservoir conditions include the Cold Lake and Athabasca deposits. Current practices for producing the above immobile tar sands include mining and solvent stimulation. Solvent stimulation is also used to remove very viscous oils from formations or reservoirs.

U.S. Pat. No. 4,373,585 issued to Fitch et al. discloses a method of recovering viscous oil from a viscous oil-containing formation wherein a selected solvent is injected into a fluid communication path in the lower portion of the formation intermediate between an injection well and a production well. A hydrocarbon solvent having a density less than oil contained in the formation and a viscosity not greater than 1/100 the viscosity of the oil contained in the formation under formation conditions is injected into the communication path. Fluids including oil are recovered from the production well until recovered fluid contains an unfavorable ratio of oil to solvent. The production well is shut-in and an additional quantity of the hydrocarbon solvent is injected into the fluid communication path.

Subsequently, the production well is also shut-in to permit the formation to undergo a soak period for a variable time. A driving fluid is then injected into the formation via the injection well and the oil is produced until there is an unfavorable ratio of oil to driving fluid. During the fluid drive recovery phase, the injection well and production well may be completed to be in fluid communication with the entire portion of the formation to obtain a more uniform displacement of the solvent and oil mixture in the formation by the driving fluid.

U.S. Pat. No. 4,293,035 issued to Fitch discloses a method of recovering viscous oil from a viscous oil bearing subsurface formation wherein a solvent is injected into a high mobility channel formed in the bottom of the formation intermediate an injection well and a production well. The solvent is injected until the ratio of produced oil to solvent becomes unfavorable. Thereafter, the injection of solvent is terminated and gas is injected into the high mobility channel to produce solvent and oil from the formation.

In U.S. Pat. No. 3,838,738 there is described a method for recovering viscous petroleum from petroleum-containing formations by first establishing a fluid communication path low in the formation. A heated fluid is then injected into the fluid communication path followed by injecting a volatile solvent such as carbon disulfide, benzene or toluene into the preheated flow path and continuing injecting the heated fluid and recovering fluids including petroleum from the production well.

In U.S. Pat. No. 3,500,917 there is disclosed a method for recovering crude oil from an oil-bearing formation having a water-saturated zone underlying the oil-saturated zone. A mixture of an aqueous fluid which has a density greater than the density of the crude oil and a solvent having a density less than the density of the crude oil are injected into the water-saturated zone and oil is produced from the formation.

U.S. Pat. No. 4,026,358 discloses a method for recovering heavy oil from a subterranean hydrocarbon-bearing formation traversed by at least one injection well and one production well wherein a slug of hydrocarbon solvent in amounts of 0.1 to about 20 percent of the formation pore volume and having a gas dissolved therein is injected into the formation via the injection well. Thereafter, a thermal sink is created in the formation by in-situ combustion or by injecting steam. The wells are then shut-in for a predetermined time to permit the formation to undergo a soak period, after which production is continued. Optionally, after the production period, the formation may be water flooded to recover additional oil from the formation.

Butler et al. in U.S. Patent No. 4,116,275 issued Sep. 26, 1978, teach a cyclic steam stimulation method for removing viscous fluids from a formation penetrated by a horizontal wellbore. Said wellbore contains a perforated casing and dual concentric tubing strings.

Solvents have a beneficial result since they dilute the crude, thereby making it mobile due to the reduction in viscosity. However, their use has not been practical commercially since this process evolves long periods of soak-time to allow the solvent to mix with the crude. Therefore, the critical factor is the soak time needed, and depending on the thickness of the oil zone, the soak time may vary from a year or two up to possibly eight or more years.

Therefore, what is needed is a solvent stimulation method for removing hydrocarbonaceous fluids from immobile tar sands or viscous fluids via a horizontal wellbore which will avoid long soak-times while providing for simultaneous solvent stimulation and continuous hydrocarbonaceous fluid production.

SUMMARY OF THE INVENTION

This invention is directed to a continuous single-well method for solvent stimulation in a horizontal wellbore containing concentric tubing strings therein which penetrate a reservoir. In the practice of this invention, a viscosity reducing agent is circulated into an inner tubing string of said wellbore so as to allow said agent to diffuse into a hydrocarbonaceous fluid producing zone of said reservoir. The viscosity reducing agent flows from the inner tubing string into the outer concentric tubing string and then diffuses out through perforations in said outer tubing string. Thereafter, it diffuses into the reservoir. Said agent is allowed to diffuse into the producing zone while the wellbore pressure is maintained at a pressure less than the reservoir pressure. Hence, a pressure difference exists thereby permitting oil flow from the reservoir to the wellbore. This difference in pressure causes hydrocarbonaceous fluid of reduced viscosity to continuously flow from the producing zone into the outer concentric tubing where it is produced to the surface.

Simultaneously, the viscosity reducing agent continues to diffuse into the productive zone of said reservoir. In this manner, a condition is created in the formation 10 which causes the pressure gradient and a concentration gradient to be opposed so as to obtain simultaneous stimulation and continuous hydrocarbonaceous fluid production from the producing zone. Hydrocarbonaceous fluids mixed with the viscosity reducing agent are produced to the surface because of the pressure differential between the wellbore pressure and the reservoir pressure. Upon reaching the surface, hydrocarbonaceous fluids are separated from said reducing agent. Later, the solvent is recycled into the reservoir where it is used to remove additional hydrocarbonaceous fluids.

It is therefore an object of this invention to provide for the use of costlier solvents because of the invention's ability to reclaim and recycle solvents from produced hydrocarbonaceous fluids.

It is another object of this invention to provide for a solvent stimulation method which requires the drilling of only one well.

It is another further object of this invention to allow for the continuous production of oil at a higher rate than is presently obtained with solvent stimulation methods currently being used.

It is yet another object of this invention to provide for more efficient draining of a formation or reservoir when utilizing a horizontal wellbore.

It is an even yet further object of this invention to stimulate a large volume of oil through an extensive area penetrated by a horizontal wellbore via a diffusive flux.

DESCRIPTION OF THE PREFERRED EMBODIMENT

Figure 1:
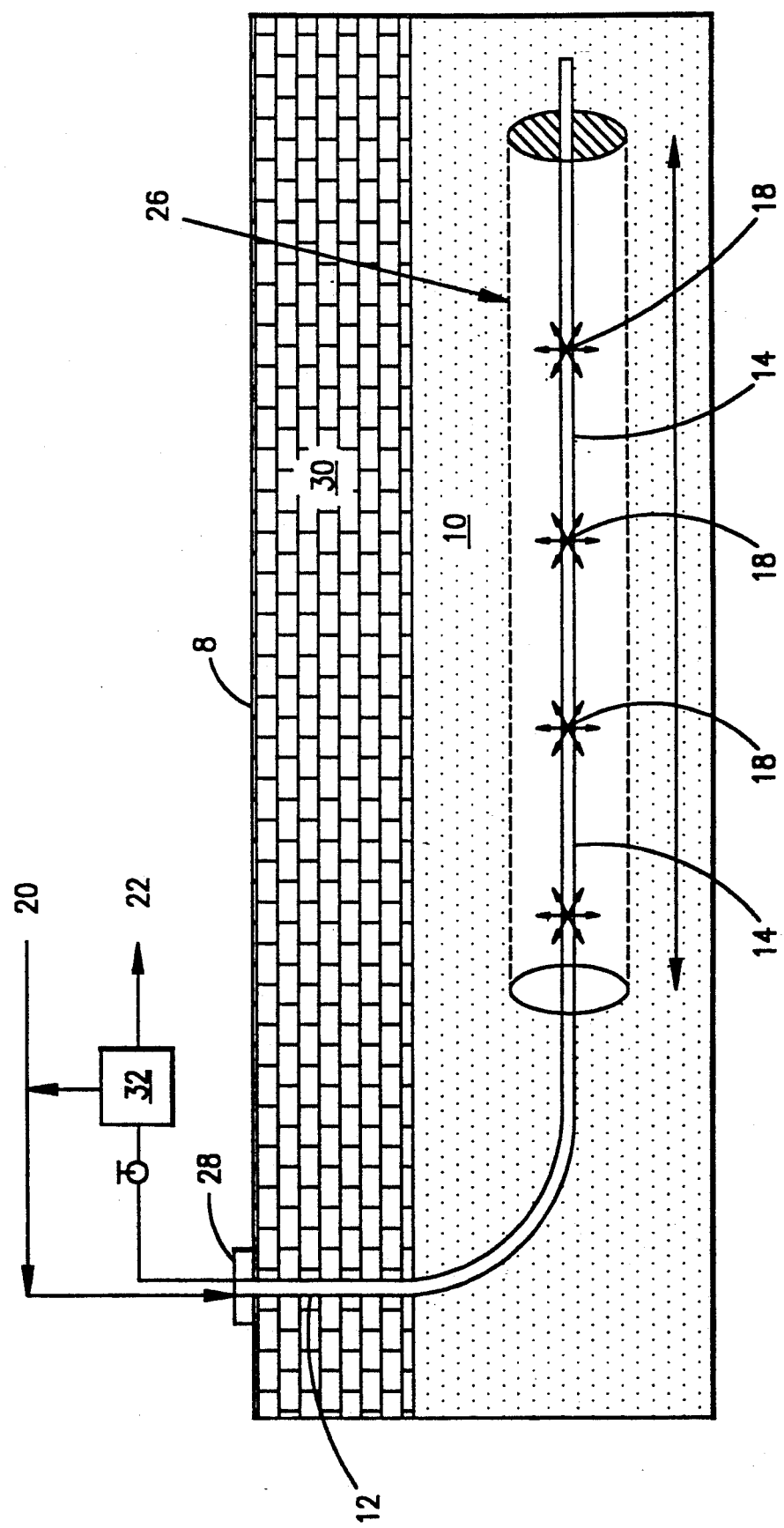
FIG. 1 is a schematic view of a reservoir penetrated by a horizontal wellbore with a radially solvent stimulated area therearound.
Figure 2:
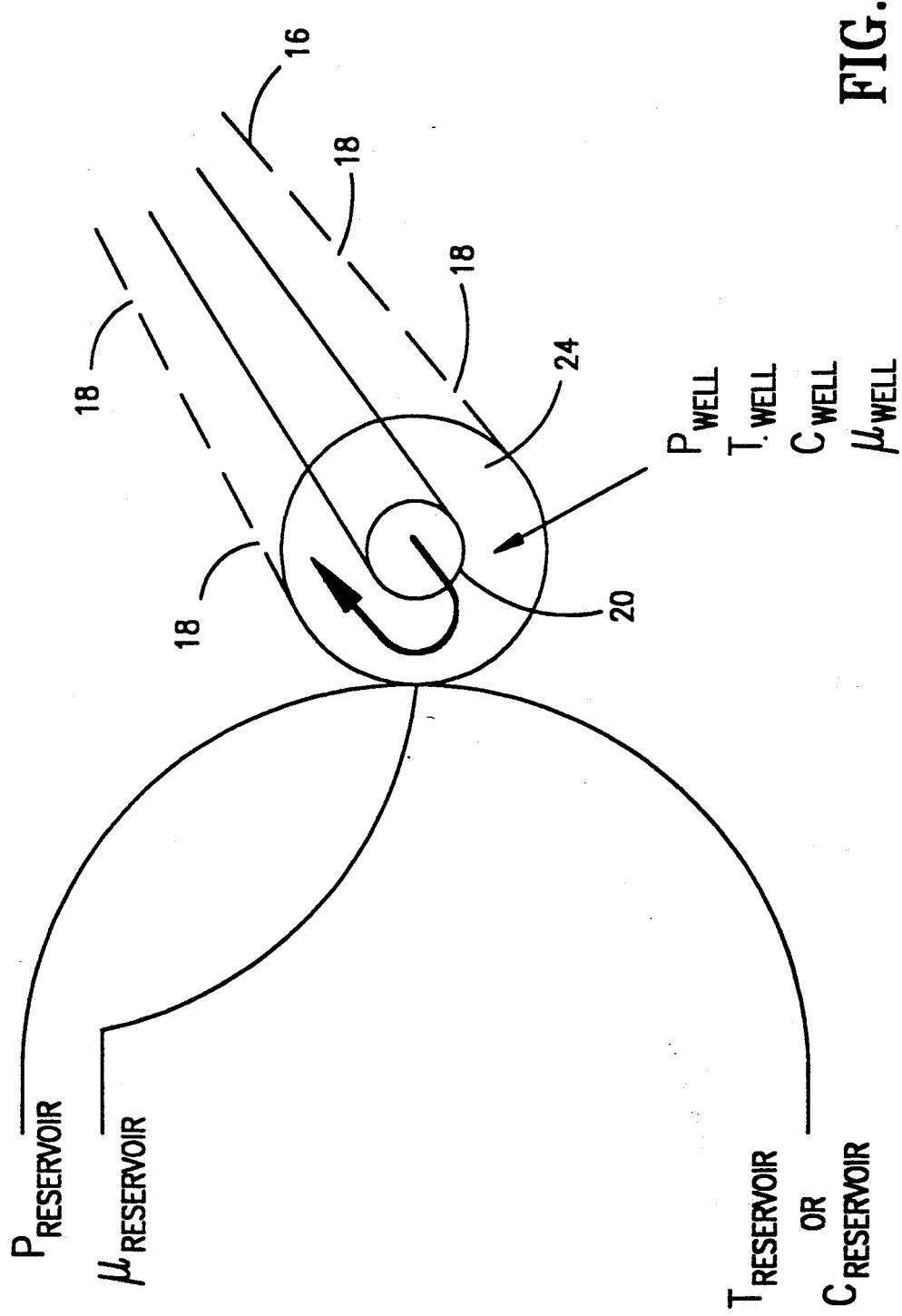
FIG. 2 is a sectional view of a horizontal wellbore as described herein which depicts the well configuration and spatial profiles.

Referring to FIG. 1, the drawing illustrates a subterranean formation or reservoir 10 which contains heavy viscous hydrocarbonaceous fluids. These fluids are disposed below the earth's surface 8 and beneath overburden 30. A wellbore having a substantially vertical section 12 and a substantially horizontal section 14 is drilled to penetrate formation 10 and extend therethrough. A continuous casing element 16 which is shown in greater detail in FIG. 2, commonly called a liner, having perforations or slots 18 is shown extending through the entire length of the wellbore. Concentric inner tubing string 20 is disposed inside of casing 16. The inner tubing 20 is placed centrally within the surrounding larger diameter formed by casing 16. Inner tubing 20 cooperates with casing 16 to form an annular space 24. Inner concentric tubing string 20 distal end terminates flush with distal end of casing 16 Concentric inner tubing string 20 and annulus 24 formed by inner tubing 20 in conjunction with casing 16 passes through wellhead 28 and communicates with the usual production conduits. As is shown in FIG. 1, a separator unit 32 is in communication with annular space 24 formed by casing 16 and inner tubing 20.

The horizontal well is drilled to penetrate the subterranean reservoir formation 10 and to extend substantially horizontally a suitable distance through the formation so as to remove hydrocarbonaceous fluids therefrom. Techniques for drilling horizontally deviated wellbores are well known and, therefore, will not be discussed further herein. After drilling the horizontal wellbore, the drill bit is removed and a perforated outer casing 16 is positioned inside the drillstring. The drillstring is then removed and concentric tubing string 20 is run into the casing or liner 16. As is known to those skilled in the art, concentric inner tubing 20 and slotted liner 16 may be run into the wellbore in any convenient manner. Inner concentric tubing string 20 and annulus 24 formed by casing 16 with perforations 18 therein are in fluid communication with the formation.

U.S. Patent No. 4,116,275 issued to Butler et al. discloses a method for recovering hydrocarbons from a hydrocarbon-bearing formation via a horizontal well. A well is drilled to penetrate a formation and extend substantially horizontally into the formation for a suitable distance. Dual concentric drill tubing strings were used in conjunction with steam to remove hydrocarbons from the formation. This patent is hereby incorporated by reference herein in its entirety.

In the practice of this invention, a viscosity reducing agent or solvent is injected into formation 10 via inner tubing string 20. Once it reaches the end of tubing string 20, said viscosity reducing agent or solvent enters into an annulus 24 formed by continuous casing element 16 and inner tubing string 20. This viscosity reducing agent or solvent enters into annulus 24 and circulates around inner concentric tubing string 20. The pressure gradient in the tubing is sufficient to cause said reducing agent or solvent to circulate around inner concentric tubing string 20 but is insufficient to cause it to flow convectively into reservoir 10. Said solvent continues to circulate around inner concentric tubing string 20 until it has progressed along the entire length of horizontal wellbore 14. Once in the annulus along the entire length of horizontal well 14, said reducing agent or solvent diffuses into formation 10 through said perforations. It continues to diffuse into said formation 10 and proceeds radially and outwardly from the slotted outer liner 16 Thus, the solvent forms a radially stimulated zone 26 around outer liner 16. Because the concentration of said viscosity reducing agent or solvent is greater in annulus 24 than in the formation 10, said reducing agent continually diffuses into formation 10 so as to reduce the viscosity of a heavy viscous hydrocarbonaceous fluid or tar sands in formation 10.

As the viscosity reducing agent continues to diffuse into the formation from radially stimulated zone 26, oil of reduced viscosity flows into slotted outer liner 16. Of course, the viscosity of the oil further away from slotter liner is greater than that oil in radially stimulated zone 26. This is so because the solvent concentration is greater in radially stimulated zone 26. For this reason, oil of reduced viscosity flows into slotted lever 16. Reservoir or formation fluids are thus saturated with solvent at the wellbore and are undersaturated to some degree into the formation. After some initial transient period, a steady state is reached where a rate of solvent diffusion is exactly counterbalanced by convective transport of solubilized material or oil of reduced viscosity into the wellbore to the surface.

Circulation pressure of solvent into the wellbore is maintained so as to allow continuous diffusion of solvent into stimulated zone 26 while allowing the formation pressure to remain at a pressure sufficient to force oil to the surface. Because of this circulation pressure maintenance, oil of decreased viscosity containing solvent is removed to the surface. A dynamic condition exists in the wellbore and formation which causes solvent to continuously diffuse from an area of higher concentration to one of lower concentration in the formation. The rate of solvent diffusion into the formation is greater than the volume of solvent removed from the formation with the oil of reduced viscosity. Although oil of reduced viscosity containing solvent is continuously removed from the formation, solvent is continuously diffusing into the formation which creates a continuous dynamic state of solvent diffusion into the formation and continuous removal of reduced viscosity oil from the formation.

Oil of reduced viscosity flows to the surface because of existing pressure in the formation in conjunction with the oil having become reduced in viscosity thereby imparting mobility to the oil. In the absence of a reduction in the viscosity of the viscous oil so as to impart mobility thereto, existing pressure in the formation would not cause it to flow to surface because its viscosity would be too great.

A "heavy" crude oil or viscous hydrocarbonaceous fluid is defined to be one that is viscous and has poor flow characteristics in the reservoir. Generally, it is a crude oil that has an API gravity of about 20° or lower. Where the formation contains oils of a high initial mobility, the stimulated zone may not be large enough to give incremental benefits since convective and diffusional fluxes are counter-current.

As defined herein, diffusion is the spontaneous mixing of one substance with another when in contact with or when separated by a microporous barrier. Said mixing takes place at the molecular level. The rate of diffusion is proportional to the concentration gradient of substances involved and increases with temperature. Diffusion herein takes place counter to the gravity, and the rate at which the different molecules diffuse in inversely proportional to the square roots of the densities.

While the reducing agent or solvent is diffusing from outer liner 16, hydrocarbonaceous fluids which have intermixed diffusionally with said solvent obtain a reduced viscosity. This reduced viscosity causes the hydrocarbonaceous fluids, water and solvent intermixed therewith which have accumulated in stimulated zone 26 to flow into outer liner 16 via perforations 18 contained therein. This flow is caused because pressure within formation 10 is greater than the pressure which is in the horizontal wellbore 14. Thus, there is a continuous migration of oil of reduced viscosity from the stimulated zone 26 into the casing liner 16 while solvent continues to diffuse into formation 10. Formation pressure causes oil of reduced viscosity, water and solvent intermixed therewith to flow into the liner 16 and continue up vertical section of wellbore 12 where it is produced to the surface via wellhead 28. Once the mixture has reached the surface, it is directed into a separator unit 32. Once in the separator unit 32, hydrocarbonaceous fluids are separated from water and solvent. Reclaimed solvent is subsequently recycled back into the formation by inner concentric tubing string 20. Hydrocarbonaceous fluids are removed via perforated liner 16 and sent to storage. Solvent gases which can be used herein include carbon dioxide, $C_1$-$C_4$ hydrocarbons, carbon monoxide, flu gases, helium, hydrogen, and almost any gas which would be soluble in oil.

Liquid solvents which can be used herein include methanol, ethanol, $C_5$-$C_{10}$ hydrocarbons, toluene, or carbon disulfide and mixtures thereof. When gases are used herein an additional advantage is obtained because it serves as a gas lift and eases the separation of produced fluids at the surface.

This diffusional solvent/solute stimulation process works because it stimulates a large volume of oil through the extensive surface area of the perforated horizontal wellbore. This extensive stimulation area causes a mass transfer process to be viable. In addition to the mass transfer process which is performed with the solvents, solvent usage can be combined with thermal stimulation to obtain even greater benefits. The solvent stimulation process alone or in combination with thermal stimulation can be used in heavy, medium or light oils. Thermal heating can be obtained from electrical induction or electromagnetic heating processes which are known to those skilled in the art. A representative process is mentioned in U.S. Pat. No. 4,485,869 which issued to Sresty et al. and which is incorporated herein by reference. Another representative process is found in U.S. Pat. No. 3,547,193 which issued to Gill. This patent is hereby incorporated by reference.

As taught in Gill, an electrode is placed in the formation which extends into the formation from a borehole which is proximate to the area containing the horizontal well to allow heating by an electrical current. Thereafter, electrical current is caused to flow from the electrode through the formation to heat the area containing the horizontal wellbore. The electrode comprises conductive shot or pellets that extend into the formation and is electrically connected to a source of supply voltage.

The pseudo steady state solution for simultaneous solvent stimulation and production which relates the pressure drawdown and the associated fluid recovery is the result of a combination mass balance, mole balance, empirical viscosity correlation, and Darcy's law. The governing differential equations for this process are depicted in FIG. 3 where the graph shows enhanced oil productivity through continuous solvent stimulation.

Figure 3:
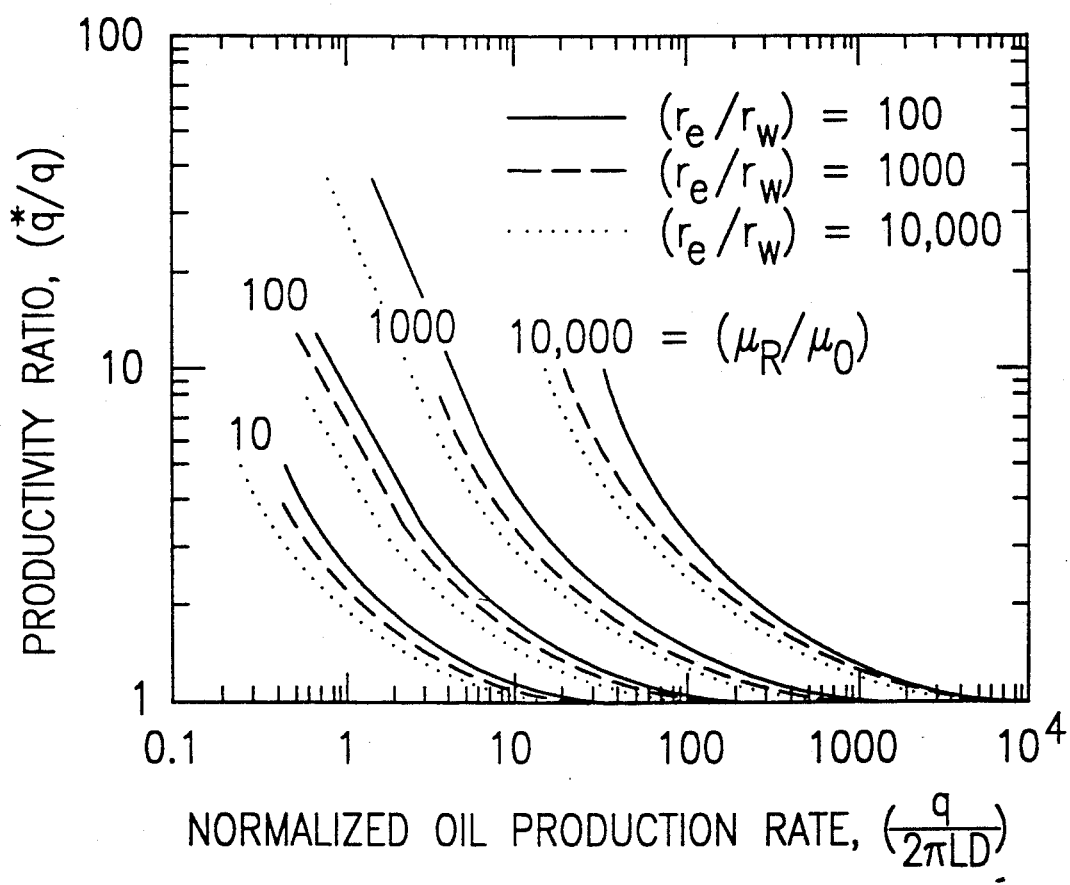
FIG. 3 is a graphical representation which depicts enhanced oil productivity through continuous solvent stimulation.

In FIG. 3, $r_e/r_w$ is the ratio of the drainage radius to the wellbore radius. As shown, q is the unstimulated oil rate, L is the length of the wellbore, D is the diffusion coefficient within the reservoir, and q* is the stimulated oil rate.

Referring to FIG. 3, the following example is an illustration of how this disclosed process can be utilized. Initially, assume that a 1,000 ft. horizontal wellbore is producing at an unstimulated primary production rate of 10 bbl/day. Using laboratory data, it has been determined that the diffusivity of our solvent ($CO_2$) in the crude oil was $4.0 \times 10^{-6}$ bbl/ft day. For this case the ratio of the stimulated to unstimulated oil viscosity is 1,000 and $r_e/r_w$ is 100. From this information the abissca of FIG. (3) is computed to be 400. Reading upwards and over to the ordinate of the figure, a stimulated oil rate ratio of 1.5 to 2.0 is shown. Thus, circulation of CO2 within the wellbore using diffusion as the stimulating process results in an increase in the oil rate of 50 to 100%.

In another preferred embodiment, the horizontal well can be used in conjunction with an interwell which is at a distance remote from the horizontal wellbore but which is in fluid communication with said wellbore. In this embodiment, the interwell is pressurized either by steam stimulation or by the use of some other fluid so as to increase the formation pressure thereby obtaining a more rapid production of hydrocarbonaceous fluids from the reservoir. An interwell or intermediate well in conjunction with a solvent flooding method is disclosed by Anderson in U.S. Pat. No. 4,398,602 which issued on Aug. 16, 1983. This patent is hereby incorporated by reference herein.

Obviously, many other variations and modifications of this invention as previously set forth may be made without departing from the spirit and scope of this invention as those skilled in the art readily understand. Such variations and modifications are considered part of this invention and within the purview and scope of the appended claims.

We claim:

1. A continuous single-well method for solvent stimulation of a reservoir containing a viscous hydrocarbonaceous fluid which is penetrated by a horizontal well comprising:
   a) circulating a viscosity reducing agent within a horizontal well which contains a concentric inner tubing string therein where said agent flows from the distal end of said string into an annulus formed between said string and a perforated liner of the well so as to diffuse into said reservoir thereby creating radially a solvent stimulated zone of reduced viscosity hydrocarbonaceous fluids along said horizontal well within the reservoir; and
   b) allowing said agent to diffuse continually into said zone while maintaining the well pressure during solvent circulation within said annulus at a pressure less than the reservoir pressure thereby creating a condition in said formation which causes a pressure gradient and a concentration gradient to be opposed so as to obtain simultaneous stimulation and continuous production of said agent and hydrocarbonaceous fluid of reduced viscosity from said zone via the annulus.

2. The method as recited in claim 1 where the viscosity reducing agent is selected from a member of the group consisting of carbon dioxide, flu gas, carbon monoxide, helium, hydrogen, $C_1$–$C_{10}$ hydrocarbons, methanol, ethanol, toluene, carbon disulfide, and mixtures thereof.

3. The method as recited in claim 1 where the viscosity reducing agent and hydrocarbonaceous fluid mixture is produced from the reservoir to the surface whereupon said agent is separated, subsequently recovered, and recycled into said wellbore.

4. The method as recited in claim 1 where the reservoir is thermally stimulated by an electrical induction or electromagnetic heating process so as to heat said stimulated zone containing the horizontal wellbore.

5. The method as recited in claim 1 where an interwell is remote from but in fluid communication with the horizontal well and said interwell is pressured by steam stimulation or other fluid injection to increase the pressure within the formation thereby obtaining a more rapid production of hydrocarbonaceous fluids from the reservoir.

* * * * *